# 2,829,975
3-α-SULFO ACYLAMINO PYRAZOLONE COLOR FORMERS IN WHICH THE ACYL GROUP CONTAINS A LONG ALIPHATIC CHAIN

Stanley P. Popeck and Heinz Schulze, Binghamton, N. Y., assignors to General Aniline & Film Corporation, New York, N. Y., a corporation of Delaware No Drawing. Application April 26, 1956
Serial No. 580,729

9 Claims. (Cl. 96—55)

The present invention relates to pyrazolone color formers bearing in the 3-position an acylamino radical containing a long aliphatic chain substituted by a sulfo group in α-position and silver halide emulsions containing such color formers.

In the production of dyestuff images by color forming development, it is the practice to employ color formers containing radicals which produce fastness to diffusion in the silver halide emulsion, on the one hand, and groups rendering the color formers soluble in water, on the other hand, and, in this connection, reference is made to Wilmanns et al. U. S. P. 2,186,849. Similarly, it is customary to employ as yellow color formers an open chain keto methylene compound, for cyan color formers compounds containing phenolic hydroxyl groups, and as magenta color formers pyrazolones, particularly those bearing an aryl radical on the nitrogen atom in the 1-position. As illustrative of pyrazolones which are fast to diffusion and which contain a solubilizing group, reference may be made to 1-(3'-sulfo-phenyl)-3-heptadecyl pyrazolone which, because of its constitution, would on its face appear to be especially suitable. It has been found, however, that such compound possesses certain disadvantages, particularly a tendency to "bronze," which phenomenon diminishes the transparency of the final picture.

It is recognized that good magenta color formers are those which yield azo methine dye images having a high transmission for blue light. Most pyrazolones are deficient in this respect due to the possession by the dyes of such images of a second absorption maximum. It is possible to improve the blue transmission by introducing substituent groups in the ortho-position of the aryl ring in 1-position as proposed, for example, in U. S. P. 2,348,463. Such substitution also has a tendency to reduce the "bronzing" effect previously referred to.

In general, however, it has been found that acylamino pyrazolones yield dye images which exhibit a high transmission for blue light, a characteristic which may be further improved on by the introduction in the aryl ring in 1-position of a cyano group or a plurality of halogen atoms as per, for example, U. S. P. 2,369,489; 2,600,788 and the like.

A further prerequisite of pyrazolone color formers and the dyes produced therefrom is a reasonable stability against exposure to light and under storage conditions. It is also important that residual color former does not react with the dye formed. It is, therefore, not surprising that artisans in this field, in an effort to meet the various requirements for satisfactory pyrazolone color formers, have resorted to elaborate syntheses, with particular attention being paid to the economics of such syntheses.

The preparation of soluble non-diffusing color formers can be greatly simplified if the diffusion inhibiting and solubilizing groups are introduced in the last step of the process and, specifically, in one operation. To this end, Bios Final Report #1335, page 75, recommends condensation of cyano acetyl anilin with octadecenyl succinic anhydride.

It is to be pointed out, however, that a single carboxy group in the molecule of a non-diffusing color former does not always ensure that a sufficiently fine dispersion of the color former in the emulsion will be obtained so that a dye of maximum transparency will be formed. There has, therefore, been a marked trend toward including in most non-diffusing color formers several water solubilizing or dispersing groups.

The acylation of 3-amino pyrazolones, as previously noted, is discussed in U. S. P. 2,369,489. This patent proposes to acylate 3-amino pyrazolones by heating the pyrazolones at a temperature of 100–160° C. with the selected acid chloride or anhydride with or without use of solvents or condensing agents. The diacylated product may be first formed but this, upon hydrolysis, yields a 3-acylamino derivative, as in U. S. P. 2,600,788. This process, when employing as acylating agents long chain sulfo carboxylic acids, will cause difficulties in the isolation of the desired monoacylaminopyrazolone.

We have now discovered that N-aryl-3-acylamino pyrazolones, in which the acylamino group provides both the nondiffusing characteristics and water solubilizing properties, can be formed by monoacylation of a 3-amino pyrazolone with a long chain sulfonated carboxylic acid. The process is not only unusually efficient but the products possess the prerequisites of pyrazolone color formers to a very high degree.

Such compounds, their preparation and silver halide emulsions containing the same constitute the purposes and objects of the present invention.

The pyrazolones, the manufacture and use of which are contemplated herein, may be represented by the following structural formula:

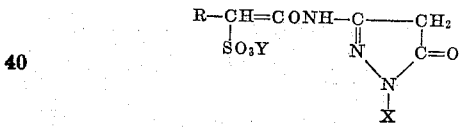

wherein X is an aromatic radical of the benzene or naphthalene series such as phenyl, cyano phenyl, halogen phenyl, i. e., mono-, di-, and tri-chlorphenyl, mono-, di- and tri-bromophenyl; alkoxyphenyl, i. e., methoxyphenyl, ethoxyphenyl; alkylphenyl, i. e., methylphenyl, ethylphenyl; aroxyphenyl, i. e., phenoxyphenyl; acylaminophenyl, i. e., acetylaminophenyl, benzoylaminophenyl, methylsulfonylaminophenyl, benzsulfonylaminophenyl; alkylsulfonylphenyl, i. e., methylsulfonylphenyl, naphthyl and the like; R is an alkyl group containing at least 9 carbon atoms such as nonyl, decyl, dodecyl, tridecyl, myristyl, pentadecyl, hexadecyl, octadecyl and the like; and Y is hydrogen, alkali metal, i. e., sodium, potassium or the like, or amine salts, i. e., pyridine and the like.

Examples of compounds within the ambit of the above formula and which we have found to be eminently suitable as magenta color formers are the following:

1. 3 - (α - sulfostearoylamino) - 1 - (4' - bromophenyl)- 5-pyrazolone
2. 3-(α-sulfostearoylamino)-1-phenyl-5-pyrazolone
3. 3 - (α - sulfostearoylamine) - 1 - (O - chlorophenyl)- 5-pyrazolone
4. 3-(α-sulfomyristoylamino)-1-phenyl-5-pyrazolone
5. 3 - (α - sulfopalmitoylamino) - 1 - (2' - methoxyphenyl-5-pyrazolone
6. 3 - (α - sulfolaurylamino) - 1 - (2' - chlorophenyl)- 5-pyrazolone
7. 3 - (α - sulfostearoylamino) - 1 - (2',4',6' - trichlorophenyl)-5-pyrazolone 8. 3 - (α - sulfostearoylamino) - 1 - (4' - cyanophenyl)-5-pyrazolone
9. 3 - (α - sulfostearoylamino) - 1 - (2' - methylphenyl)-5-pyrazolone It is, of course, understood that these compounds are preferably used in the form of their alkali metal or amine salts.

The above compounds are prepared by starting with the monoalkali metal or amine salts of α-sulfo long chain alkyl carboxylic acids, on the one hand, and 3-amino pyrazolones containing in the 1-position an aromatic radical as aforesaid, on the other hand. The sulfo carboxylic acid may be prepared according to the method described in our copending application Serial No. 580,728, filed April 26, 1956, and entitled "Preparation and Isolation of Alkali Metal and Ammonium Sulfonates of Long Chain Carboxylic Acids."

The α-sulfo carboxylic acid may be converted to its acid chloride by conventional procedure and reacted with the 3-amino pyrazolone in the presence of an acid binding agent such as pyridine, trimethylamine and the like. Preferably, however, the aforesaid salts of the sulfo long chain aliphatic carboxylic acids are reacted with the amino pyrazolone in the presence of a tertiary amine such as pyridine, picoline, trimethylamine or the like with phosphorous trichloride as the condensing agent at temperatures between 0–100° C. Such reaction is a modification of the phosphazo process for acylation of amines (Grimmel et al., JACS 68, 539).

The color formers produced by this method are easily isolated in a pure form and give dyes which are highly transparent, a result which is rather unexpected inasmuch as the salts of the long chain sulfo alkyl carboxylic acids per se have rather low solubility in water. The color formers, moreover, exhibit good stability and absorption characteristics, and the dyes therefrom are affected very little by the presence of residual couplers. The blue transmission is especially high for those dyes resulting from the above pyrazolones and which contain in the 1-position of the pyrazolone a phenyl group as above which is ortho-substituted.

It is believed very significant to observe from the above formula of our new compounds that the carbon atom α to the carbonyl group in the sulfocarboxylic acid moiety plays the following roles:
1. Serves to link to the molecule the water solubilizing group;
2. Serves to link to the molecule the non-diffusing group; and
3. Serves to link to the molecule the —CONH— linkage which is joined to the pyrazolone ring. Due to this peculiar configuration, our compounds provide a convenient method for varying selectively the dye forming part of the molecule, on the one hand, while permitting changes in solubility and diffusion characteristics by independently changing the radical R, on the other hand.

The following examples illustrate the present invention but it is to be understood that the invention is not restricted thereto.

PREPARATION OF COLOR FORMER

Example I

In a 500 ml. 3-neck flask equipped with a stirrer, reflux condenser, moisture trap and dropping funnel were heated to reflux under exclusion of moisture 0.1 mol (25.4 grams) of 3-amino-1-(4'-bromophenyl)-5-pyrazolone; M. P. 167.5–168.5°
0.1 mol (39 grams) of the monosodium salt of 2-sulfostearic acid
80 mls. of pyridine
160 mls. of benzene After all moisture was removed, the reaction mixture was cooled in an ice bath with stirring and 4.5 mls. (0.0515 mol) of phosphorus trichloride dissolved in 25 mls. of dry benzene were added within one hour with ice cooling. Then the mixture was heated to reflux for two hours. 8.25 grams (0.206 mol) of sodium hydroxide dissolved in about 50 mls. of water and 21 grams of crystallized sodium acetate (0.154 mol) were added with stirring to the reaction mixture while hot. On a water bath, the solvent was evaporated. (It may sometimes be preferable to remove the separating watery layer before evaporation.) The residue was dissolved in 500 mls. of hot acetic acid and treated with charcoal. With ice cooling, the mixture was added to 85 mls. of concentrated hydrochloric acid (1 mol), filtered and washed free from hydrochloric acid with acetic acid. The filter cake was heated with stirring with 600 mls. of 80% acetic acid for 15 minutes, filtered hot with suction and washed with 600 mls. of 80% acetic acid.

Yield: 32.4 grams=54%. Analysis: Calc.: Percent C, 54.00; H, 7.00; Br, 13.32. Found: Percent C, 54.12; H, 7.14; Br, 12.97.

Example II

The procedure is the same as in Example I, excepting that the pyrazolone employed is 3-amino-1-phenyl-5-pyrazolone.

Example III

The procedure is the same as in Example I, excepting that the pyrazolone employed is 3-amino-(O-chlorophenyl)-5-pyrazolone melting at 164 to 164.5° C. and prepared by the condensation of diethylmonoimidomalonate and O-chlorophenyl-hydrazine.

Example IV

The procedure is the same as in Example I, excepting that in lieu of the 2-sulfo stearic acid, an equivalent quantity of the mono sodium salt of 2-sulfopalmitic acid was employed.

SILVER HALIDE EMULSIONS

Example V

One gram of the pyrazolone color former of Example I was dissolved in 20 mls. of water and sufficient sodium hydroxide to give the solution a pH of 7.5. The solution was added to a silver bromide emulsion which was coated on a base. Upon exposure and development in a color developer containing as the active principle N-ethyl-N-hydroxyethyl-p-aminoanilin there was obtained a magenta dye image having an absorption maximum at 537 mu.

Example VI

The color former of Example II was added to a silver bromide emulsion as in Example V and the emulsion coated on a base and dried. Upon exposure and development in a color forming developer, such as that of Example V, a magenta dye image was obtained having an absorption maximum at 528 mu.

Example VII

The color former of Example III was added to a silver bromide emulsion and the latter coated on a base and dried. Upon exposure and processing, as in Example V, a magenta dye was obtained having an absorption maximum at 540 mu.

Example VIII

On a conventional cellulose acetate carrier is coated a red sensitive emulsion containing 20 grams of color former F-654 (Bios Final Report #1355; p. 70). On top of that is coated a green sensitized layer of an emulsion prepared according to Example VII. A thin dischargeable yellow filter is then coated followed by a blue sensitive layer containing a non-diffusing color former for yellow. On exposure and color development a record of a blue, green, and red separation picture is formed.

Modifications of the invention will occur to persons skilled in the art. Thus, in lieu of the specific pyrazolones of the examples, any pyrazolone meeting the prerequisites of the above general formula may be employed. Similarly, the color formers may be dispersed not only in gelatin layers but also in layers of modified gelatin or of synthetic resins such as polyvinyl alcohol with properties simulating those of gelatin. Film produced with our color formers may utilize as a base a cellulose ester, polystyrene polyamide, polyester or a non-transparent reflecting material such as paper. Finally, any of the color developers used in the formation of quinoneimine and azomethine dyes by color development may be employed. We, therefore, do not intend to be limited in the patent granted except as necessitated by the appended claims.

We claim:

1. The process of producing a magenta dyestuff image in a silver halide emulsion which comprises exposing said emulsion to light and developing the same with a primary aromatic amino developer in the presence of a color former for magenta having the following structural formula:

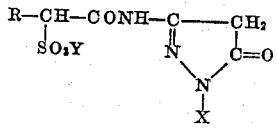

wherein R is an alkyl radical containing at least 9 carbon atoms; X is an aromatic radical selected from the class consisting of those of the benzene and naphthalene series; and Y is selected from the class consisting of hydrogen, alkali metals and amines.

2. The process as defined in claim 1, wherein the color former is located in the silver halide emulsion.

3. The process as defined in claim 2, wherein the color former is 3-($\alpha$-sulfostearoylamino)-1-(4'-bromophenyl)-5-pyrazolene.

4. The process as defined in claim 2, wherein the color former is 3-($\alpha$-sulfostearoylamino)-1-phenyl-5-pyrazolone.

5. The process as defined in claim 2, wherein the color former is 3-($\alpha$-sulfostearolamino)-1-(O-chlorophenyl)-5-pyrazolone.

6. A light-sensitive silver halide emulsion containing as a color former for magenta a non-diffusing compound of the following structure:

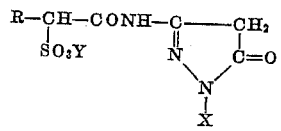

wherein R is an alkyl radical containing at least 9 carbon atoms; X is an aromatic radical selected from the class consisting of those of the benzene and napthalene series; and Y is selected from the class consisting of hydrogen, alkali metals and amines.

7. The composition as defined in claim 6, wherein the color former is 3-($\alpha$-sulfostearoylamino)-1-(4'-bromophenyl)-5-pyrazolone.

8. The composition as defined in claim 6, wherein the color former is 3-($\alpha$-sulfostearoylamino)-1-phenyl-5-pyrazolone.

9. The composition as defined in claim 6, wherein the color former is 3-($\alpha$-sulfostearoylamino)-1-(O-chlorophenyl)-5-pyrazolone.

References Cited in the file of this patent

UNITED STATES PATENTS 2,186,849     Wolfen et al. _____ Jan. 9, 1940

FOREIGN PATENTS 232,384     Switzerland _____ Sept. 1, 1944